(12) United States Patent
Wagner et al.

(10) Patent No.: US 11,148,479 B2
(45) Date of Patent: Oct. 19, 2021

(54) TIRE PRESSURE SENSOR AND USE OF A TIRE PRESSURE SENSOR

(71) Applicant: HUF BAOLONG ELECTRONICS BRETTEN GMBH, Bretten (DE)

(72) Inventors: Markus Wagner, Ludwigsburg (DE); Benjamin Muller, Essen (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 37 days.

(21) Appl. No.: 16/609,304

(22) PCT Filed: Feb. 6, 2018

(86) PCT No.: PCT/EP2018/052917
§ 371 (c)(1),
(2) Date: Oct. 29, 2019

(87) PCT Pub. No.: WO2018/202334
PCT Pub. Date: Nov. 8, 2018

(65) Prior Publication Data
US 2020/0062049 A1 Feb. 27, 2020

(30) Foreign Application Priority Data
May 4, 2017 (DE) .................... 10 2017 109 631.0

(51) Int. Cl.
*B60C 23/04* (2006.01)
(52) U.S. Cl.
CPC ...... *B60C 23/0445* (2013.01); *B60C 23/0479* (2013.01)

(58) Field of Classification Search
CPC ............ B60C 23/0445; B60C 23/0479; B60C 23/0422; B60C 23/0408; B60C 23/0401;
(Continued)

(56) References Cited

U.S. PATENT DOCUMENTS 5,783,992 A * 7/1998 Eberwine ............ B60C 23/0433
340/445
9,387,732 B1 7/2016 Gunawan
(Continued)

FOREIGN PATENT DOCUMENTS

| EP | 2 263 889 A1 | 12/2010 |
| WO | WO 2015/107203 A1 | 7/2015 |
| WO | WO 2015/138431 A2 | 9/2015 |

OTHER PUBLICATIONS

International Search Report of International Application No. PCT/EP2018/052917 dated May 14, 2018, 4 pages.
(Continued)

*Primary Examiner* — Adnan Aziz
(74) *Attorney, Agent, or Firm* — Fay Sharpe LLP (57) ABSTRACT

A tire pressure sensor includes a pressure sensor element, a Bluetooth low-energy (BLE) interface and a microcontroller that is coupled to the pressure sensor element and the BLE interface. The microcontroller can be switched between an energy saving mode and an active operating mode. A battery is provided for voltage supply. The BLE interface is designed to establish a BLE communication with a reader designed for BLE communication and to initiate switch-over of the microcontroller from its energy saving mode to its active operating mode in response to the BLE communication being established.

16 Claims, 3 Drawing Sheets

(58) Field of Classification Search
CPC ............ B60C 23/0433; B60C 23/0454; B60C 23/0455; B60C 23/0457; B60C 23/0474
See application file for complete search history.

(56) References Cited

U.S. PATENT DOCUMENTS

| | | | | |
|---|---|---|---|---|
| 9,649,896 | B1* | 5/2017 | Lin | B60C 23/0488 |
| 9,870,660 | B1* | 1/2018 | Patterson | G06K 7/10009 |
| 2002/0030592 | A1* | 3/2002 | Hakanen | B60C 23/0408 340/442 |
| 2002/0044050 | A1 | 4/2002 | Derbyshire et al. | |
| 2004/0017291 | A1* | 1/2004 | Hardman | B60C 23/0454 340/505 |
| 2005/0110623 | A1* | 5/2005 | Schulze | B60C 23/0408 340/445 |
| 2007/0193349 | A1* | 8/2007 | Petrucelli | B60C 23/0408 73/146.8 |
| 2007/0208841 | A1* | 9/2007 | Barone | B61L 15/0036 709/223 |
| 2008/0157950 | A1* | 7/2008 | Mori | B60C 23/045 340/438 |
| 2009/0058626 | A1* | 3/2009 | Watabe | B60C 23/0462 340/447 |
| 2013/0076491 | A1* | 3/2013 | Brandsma | H04B 5/0062 340/10.3 |
| 2014/0188348 | A1* | 7/2014 | Gautama | B60W 10/30 701/48 |
| 2014/0240088 | A1* | 8/2014 | Robinette | G08B 13/1427 340/5.61 |
| 2014/0368327 | A1* | 12/2014 | Darrer | B60C 23/0433 340/447 |
| 2016/0375733 | A1* | 12/2016 | Lesesky | B60C 23/0494 340/442 |
| 2017/0080762 | A1* | 3/2017 | Guinart | B60C 23/0476 |
| 2017/0305212 | A1* | 10/2017 | Lin | B60C 23/0442 |
| 2017/0326926 | A1* | 11/2017 | So | B60C 23/0401 |
| 2018/0025603 | A1* | 1/2018 | Tyler | G06Q 10/0833 340/572.1 |
| 2019/0255892 | A1* | 8/2019 | Coombs | B60C 23/00318 |

OTHER PUBLICATIONS

International Preliminary Report on Patentability/Written Opinion of International Application No. PCT/EP2018/052917 dated May 14, 2018, (with English Translation) 13 pages.

* cited by examiner

TIRE PRESSURE SENSOR AND USE OF A TIRE PRESSURE SENSOR

BACKGROUND

The invention relates to a tire pressure sensor which is provided particularly for a trailer tire.

Tire pressure monitoring systems are part of the standard equipment of many modern vehicles. In addition to equipping motor vehicles with tire pressure monitoring systems, is also known to equip trailers with tire pressure monitoring systems.

Tire pressure monitoring systems are used to determine and monitor tire pressure. Tire pressure sensors are independently operated system components which are positioned on a tire, wherein tire pressure sensors arranged both on the inside of the tire and on the outside of the tire are known. The tire pressure sensor has a pressure sensor element that detects the internal pressure of the tire. In many cases, the tire pressure sensor, in addition to other components, also comprises sensor elements for detecting further physical variables, such as the air temperature within the tire and the acceleration of the sensor. The acquired measurement data are transmitted wirelessly to a control device in the vehicle. In order to be able to operate independently, a tire pressure sensor has a battery for energy supply, which is usually designed as a button cell. Frequently, a measuring circuit is also provided which measures the voltage provided by the battery.

For trailers, unlike for motor vehicles, the situation of remaining stationary over a comparatively long period of time can occur. Examples are seasonally used trailers, such as campers, boat trailers, horse trailers, or agriculturally utilized trailers. In order to extend the lifespan of batteries in tire pressure sensors, it is known in practice to reduce the energy consumption of the tire pressure sensors during an extended downtime of the trailer. This is implemented with tire pressure sensors which can be put from an active operating mode into an energy-saving mode for an extended downtime. In these systems, the tire pressure sensor returns to the active operating mode in response to a movement of the wheel after said movement has been detected by an acceleration sensor element of the tire pressure sensor and converted into a wake-up signal, which can be evaluated, for example, by a microcontroller of the tire pressure sensor.

However, such or similar known solutions are disadvantageous, among others, because their realization is comparatively elaborate due to the required permanent availability of an acceleration detection. In addition, trailer operators wish to perform pressure detection without having to first move the trailer forcibly to prompt the sensors.

Against this background, the invention addresses the problem of providing a tire pressure sensor which allows for an extension of the battery life and is still conveniently responsive and readable at all times.

BRIEF SUMMARY

The problem is solved by a tire pressure sensor having the features of claim 1.

A tire pressure sensor is provided. The tire pressure sensor comprises:
 a pressure sensor element,
 a radio communication interface which is designed, for example, as an NFC interface, as a Bluetooth interface, or as a Bluetooth low-energy interface,
 a microcontroller that is coupled to the pressure sensor element and the radio communication interface and that can be switched between a mode with reduced energy consumption (energy-saving operating mode) and an active operating mode, and
 a battery for voltage supply.

The pressure sensor element is that part of the tire pressure sensor which is provided for the actual detection of the physical pressure.

According to the invention, the radio communication interface is designed to establish radio communication with a reader designed for radio communication and to initiate a switch-over of the microcontroller from its mode with reduced energy consumption to its active operating mode on the basis of the radio communication being established. According to the invention, the radio communication interface controls the switch-over of the microcontroller to the active operating mode under the condition that the radio communication interface has performed a radio communication with a suitable reader.

The microcontroller is used particularly for detecting the measured values of the pressure sensor element. The microcontroller can also perform other tasks, such as a further processing of the measured values, controlling the pressure sensor element and/or performing a self-diagnosis.

The microcontroller can be switched between a mode with reduced energy consumption and an active operating mode. The mode with reduced energy consumption is characterized in that the energy consumption of the microcontroller is lower than in the active operating mode.

The mode with reduced energy consumption can be implemented in the microcontroller itself. Alternatively or additionally, it can be provided that the voltage supply of the microcontroller can be disconnected, and a disconnection of the microcontroller from the voltage supply is used to put the microcontroller in the mode with reduced energy consumption. A special case of the energy-saving mode is thus the deactivated mode, in which the microcontroller does not consume energy because it is disconnected from the electric voltage supply.

Advantageous and expedient embodiments and developments of the invention are disclosed in the dependent claims.

As an alternative or to supplement the battery, an energy generator can be provided.

According to a variation of the invention, the radio communication interface is designed as a BLE interface.

The BLE interface is an element or a group of elements which is provided particularly for the transmission of the detected pressure data. In addition, the BLE interface is responsible for establishing a connection to another BLE interface.

According to the invention, the BLE interface is an element that at least meets the requirements of the Bluetooth low-energy transmission technology, as defined in one of the Bluetooth specifications with the version number 4.0 or higher, provided by the Bluetooth consortium, e.g., under https://www.bluetooth.com/specifications/adopted-specifications. The term BLE interface comprises all physical components required for BLE communication with another device provided for BLE communication. The term BLE interface particularly also comprises the transmitting and/or receiving antenna or antennas required for the radio transmission.

Alternatively or additionally, it can be provided that a restoration of the voltage supply of the microcontroller for the switch-over of the microcontroller to the active operating mode is provided.

A design, in which the pressure sensor element, the BLE interface, and the microcontroller are entirely or in part components of a module, can be expedient, not least with regard to the production costs. Particularly advantageously, the module has an integrated circuit or the module is designed entirely as an integrated circuit. However, alternatively, it can also be provided that the tire pressure sensor consists of at least two independent elements which are coupled to one another.

According to the invention, the BLE interface is designed to establish a BLE communication with a reader designed for BLE communication and to initiate a switch-over of the microcontroller from its mode with reduced energy consumption to its active operating mode on the basis of the BLE communication being established. According to the invention, the BLE interface controls the switch-over of the microcontroller to the active operating mode under the condition that the BLE interface has performed a BLE communication with a suitable reader.

It can be particularly provided that the BLE interface is designed to establish a BLE communication with a reader designed for BLE communication and to initiate a switch-over of the microcontroller from its mode with reduced energy consumption to its active operating mode in response to the BLE communication being established, i.e., establishing the BLE communication is the required prerequisite, in a specific embodiment also the sufficient prerequisite, for the switch-over of the microcontroller to the active operating mode.

The reader is not part of the invention. However, the suitability and readiness of devices designed for a BLE communication, called "reader" within the context of this description, to establish a BLE communication in accordance with the specification, i.e., to start and possibly execute a BLE communication, are essential to the invention. For example, the reader can be provided specifically for the use in conjunction with the invention. However, the reader can also be a commercially available, optionally modified device, such as a smartphone, on which an app for communication with the tire pressure sensor is installed.

Correspondingly, the microcontroller is put into its active operating mode only when the BLE interface has found a suitable communication partner in and established a BLE communication with the reader. In order to meet this requirement, it can be provided that the BLE communication with any appropriately designed reader is sufficient. Alternatively, it can be provided that additional prerequisites must be met. For example, as an additional prerequisite, it can be required that the BLE communication is executed with a reader that verifies or has verified its authorization. Other additional or alternative prerequisites can also be provided.

The microcontroller of the tire pressure sensor according to the invention thus remains in its inactive mode as long as no BLE communication is established by the BLE interface. If the BLE interface detects and establishes the BLE communication with a suitably designed reader as a communication partner, the BLE interface initiates the switch-over of the microcontroller.

The BLE interface can initiate the switch-over of the microcontroller to the active operating mode in a variety of ways. For example, it can be provided that the BLE interface itself has or is coupled to its own interface microcontroller, which remains in a standby mode and is prompted in response to the BLE communication being established and subsequently actuates the voltage supply of the microcontroller. However, any other way of switching the microcontroller to the active operating mode or having it switched to the active operating mode by another or a plurality of other components can be provided. Both directly initiated switching operations to the active operating mode and the output of indirect triggers, which are then interpreted and implemented by other elements, can be provided.

It is of secondary importance for the invention, how and/or at what time the switch-over of the microcontroller from its active operating mode to the mode of reduced energy consumption takes place. For example, it can be provided that the microcontroller is automatically put into the mode with reduced energy consumption when no BLE communication of the BLE interface with another reader has taken place for a predetermined period of time. Alternatively or additionally, a user-initiated manual switch-over of the microcontroller to the energy-saving mode can be provided, or the transition can take place on the basis of data of an acceleration sensor.

One of the advantages of the invention is that the microcontroller is switched to its active operating mode and thereby put into a functioning mode without the need to move the tire. The tire pressure sensor is therefore particularly suitable for trailers that are not moved over long periods of time. For example, if the tire pressure sensor is arranged in a tire of a trailer, the tire pressure can be detected before the trailer is coupled and moved. As soon as a suitably designed reader reaches the proximity of the tire pressure sensor and the microcontroller is switched to its active operating mode in response to the BLE communication being established, the tire pressure can be detected and transmitted to the reader. It is thus possible that a towing vehicle of a trailer reads the information regarding the tire pressures of the trailer tire, even before a coupling to the vehicle takes place.

Furthermore, a long-term responsiveness of the tire pressure sensor can be achieved due to the very energy-efficient operation of the BLE interface. Because, even after an extended downtime, a sufficiently high energy reserve in the battery for the tire pressure determination and transmission as well as for the further operation of the tire pressure sensor can be expected.

According to one embodiment, it can be provided that the tire pressure sensor has a position and/or acceleration sensor, and that the switch-over of the microcontroller to its active operating mode also depends on a change in the position and/or acceleration of the position and/or acceleration sensor.

In one embodiment of the tire pressure sensor, it is provided that the BLE interface is designed to assume an advertising state for indicating its readiness to establish a connection. The tire pressure sensor is preferably designed to be in an advertising state whenever the microcontroller is in its energy-saving mode and the BLE interface has not yet established communication with a counter device. In this case, the BLE interface is designed to initiate the switch-over of the microcontroller to its active operating mode at a time which immediately, or after a predetermined interval, follows a detection of a connect request of the reader by the BLE interface.

The terms "advertising state" and "connect request" are to be understood in terms of their meaning according to specifications, as defined, for example, in the initially mentioned Bluetooth specifications.

During a period, in which the microcontroller is in an energy-saving mode, the BLE interface communicates information about its presence and its readiness to connect by means of the transmission of one or more data packets designated according to specifications as advertising channel packet. In a case, in which a reader receives such an advertising channel packet, it responds according to specifications with a connect request. Immediately upon receipt of the connect request, or after a predetermined interval, after the detection of the connect request, the BLE interface initiates the microcontroller to switch over to its active operating mode. In this embodiment, it is thus provided that even the request of the reader for establishing a connection of the BLE interface is interpreted by the BLE interface as a trigger, with which the BLE interface is compelled to effect the return of the microcontroller to the active operating mode by initiating the appropriate switching operation.

In an alternative development, it can be provided that the BLE interface is designed to assume an advertising state in order to indicate its readiness to establish a connection when the microcontroller is in its energy-saving mode. For that purpose, the BLE interface is designed to initiate the switch-over of the microcontroller to its active operating mode at a point in time that immediately, or after a predetermined interval, follows an establishing of a BLE connection of the BLE interface with the reader.

This development thus provides the specification that the BLE connection of the BLE interface with the reader must be established. The BLE communication is thus established. In other words, both the BLE interface and the reader have, in this context, assumed the connection state according to specifications. Compared to the alternative development described above, the required establishing of the BLE connection leads to the advantage that, after the detection of a connect request and before the intended completion of the establishment of the BLE connection, further prerequisites can be verified. By additionally verifying the compliance with further prerequisites, it can be achieved that the microcontroller does not return to its active operating mode simply because of a sufficient proximity of any reader designed for BLE communications, but that the required prerequisites can be adapted in a more specific and narrow manner. For example, it can be provided that an identification code of the reader is queried, and the microcontroller is switched over to the active operating mode only in the event that the identification code corresponds to an expected identification code.

In an advantageous development, it is provided that the BLE interface is designed to form a network or part of a network with the reader as part of the BLE communication according to specifications, in which the BLE interface assumes peripheral status and the reader assumes central status.

Alternatively, it can be provided that the BLE interface and the reader are designed to form a network or pail of a network, in which the BLE interface assumes central status and the reader assumes peripheral status.

It can also be provided that, after establishing a connection with the reader in the connected mode, the transmission and reception power and/or the transmission times can be set, preferably by means of controlling by the reader.

By forming such a network, the prerequisites that the reader can address, read out and/or control the tire pressure sensor and possibly other tire pressure sensors present in the proximity are advantageously created.

It can particularly be provided that the BLE interface is designed to assume a scanning state according to specifications, particularly in the central status.

When the BLE interface operates in the scanning state, the prerequisites for the detection of further BLE interfaces by the BLE interface are provided, wherein said further BLE interfaces can subsequently be integrated into a tire pressure sensor network. In the context of this development, it is thus provided that the BLE interface assumes a peripheral status in a network with the reader and assumes a central status in another network. In such case, the other network comprises, for example, the BLE interface and further BLE interfaces of further tire pressure sensors. For example, it can be provided that a number of tire pressure sensors of several or all tires of a vehicle, for example, of two or four tires of a trailer, are interconnected in a tire pressure sensor network. In this tire pressure sensor network, the BLE interface acts as the central, while the further BLE interfaces are integrated into the network by the central. In other words, the BLE interface serves as an intermediary between the reader and the further BLE interfaces of the other tire pressure sensors. This is achieved by the BLE interface assuming peripheral status with respect to the reader and assuming central status with respect to the further BLE interfaces.

At this stage, it can already be provided that the BLE interface designed as the central accepts and temporarily stores measurement data, and after establishing a connection (connect) with a reader, said BLE interface transmits the temporarily stored data to the reader.

However, after establishing the connection, it is also possible to provide a network, in which the BLE interface is preferably integrated as a master, and the reader and the further BLE interfaces are integrated as a slave.

In a development it can be provided that, after establishing a connection with the reader in the connected mode, the transmission and reception power and/or the transmission times can be set, preferably by means of controlling by the reader.

Furthermore, it can optionally be provided that a BLE connection can only be established when an authentication by means of an NFC sensor has been performed on the reader or on the tire pressure sensor, said NFC sensor being coupled to the tire pressure sensor and/or to the reader and designed for the authentication of a suitable NFC module which can identify an authorized operator.

According to another advantageous embodiment, it can be provided that the BLE interface has a memory module or is coupled to a memory module, wherein identification data of at least one predetermined identifiable reader are stored in the memory module. In this case, the BLE interface is also designed to initiate the switch-over of the microcontroller to its active operating mode only after the prerequisite of the BLE communication taking place with the predetermined reader is met. It can thus be ensured that, before the switch-over of the microcontroller to the active operating mode, the reader is in fact an authorized reader. This ensures that no readers other than the authorized reader can be the cause for the microcontroller resuming its active operating mode again, As a consequence, this results in the advantage that the energy consumption of the microcontroller is optimized because an unnecessary activation of the microcontroller is avoided, In a specific embodiment, it is provided that the microcontroller and the battery are connected by means of a separable galvanic coupling. In such case, it is provided that the galvanic coupling between the battery and the microcontroller is undone when the microcontroller is in the mode with reduced energy consumption. It is further provided that the radio communication interface, which is preferably designed as a BLE interface, is designed to establish the electrical connection for effecting a voltage supply to the microcontroller, which causes the microcontroller to switch over to the active operating mode.

In this specific embodiment, it is therefore provided that the switch-over of the microcontroller from its energy-saving mode to its active operating mode is effected by interrupting and restoring the power supply. This embodiment is advantageous because it is not necessarily required to implement an energy-saving sleep mode in the microcontroller; instead, a change of the operating mode of the microcontroller can be achieved in a reliable manner by direct interference in the voltage supply of the microcontroller. In this embodiment, it is particularly ensured in a structurally simple manner that the energy consumption of the microcontroller in its energy-saving operating mode is minimized due to the complete decoupling of the microcontroller from the voltage supply.

According to a further embodiment, it can be provided that, in response to the radio communication being established, a first-time or repeated determination of physical parameters of the tire, particularly pressure, temperature and/or acceleration, is triggered.

According to a further aspect of the invention, which is conceivable both dependently and independently from the above descriptions, a use of a tire pressure sensor according to the invention or one of its developments for transmitting a tire pressure of a stationary trailer to a portable reader or to a reader carried along in a towing vehicle, is provided.

A further aspect, which can be pursued dependently but also independently from the above aspects, relates to a retrofit kit having at least one tire pressure sensor or one of its developments according to the invention, wherein the tire pressure sensor is supposed to be used to retrofit a tire of a trailer with said tire pressure sensor. The retrofit kit can be characterized particularly in that the tire pressure sensor is designed as a module in order to allow for a simple retrofitting of a tire.

A further aspect of the invention relates to the basic idea of a method for operating a tire pressure sensor, particularly a tire pressure sensor of the initially described type one of its developments. The method provides that a BLE interface of the tire pressure sensor establishes a BLE communication with a reader that is designed for BLE communications; in response to the BLE communication being established, the BLE interface initiates a switch-over of the microcontroller from an energy-saving mode to an active operating mode. According to this aspect of the invention, the tire pressure sensor according to the invention as well as its developments are supposed to be pursued as an implementation according to the method within the framework of the independent aspect.

A further aspect relates to a method for operating a tire pressure sensor. For example, it can be provided that, in addition to the microcontroller, a second microcontroller is provided, wherein the microcontroller is designed to control a first functionality, and the second microcontroller is designed to control a second functionality. The microcontroller and the second microcontroller are switchable independently from one another between a mode with a reduced energy consumption and an active operating mode. The first microcontroller is designed to put the second microcontroller into an active operating mode when the first microcontroller has assumed a predetermined mode, preferably when the BLE communication has assumed a predetermined mode.

In a specific development, it can be provided that the radio communication interface designed as a BLE interface repeatedly transmits measured values or tire parameters derived from measured values with an advertise package in the advertising state of the tire pressure sensor. A period between a first transmission and a repeated and updated transmission is selected on the basis of a driving status of the tire, in which the tire pressure sensor is arranged. The transmitted data are received by a reader designed for BLE communication.

A development of the method provides that
in a first phase, the data are transmitted using each of the three advertising channels provided,
in a second phase, the reader sequentially queries a first of the three advertising channels, followed by a second of the three advertising channels, and subsequently a third of the three advertising channels, wherein each query is followed by a pause.

For that purpose, it can be provided that, after a specific duration of the second phase, the second phase is interrupted by a third phase, in which a transmission takes place using each of the three advertising channels provided.

This approach is advantageously accompanied by energy savings.

It is self-evident that the features mentioned above and yet to be described below can be used not only in the combination described but also in other combinations or in isolation without departing from the scope of the present invention.

BRIEF DESCRIPTION OF THE DRAWINGS

Further details, features and, advantages of the subject matter of the invention will become apparent from the description in conjunction with the drawings.

The drawings show in.

DETAILED DESCRIPTION

Figure 1:
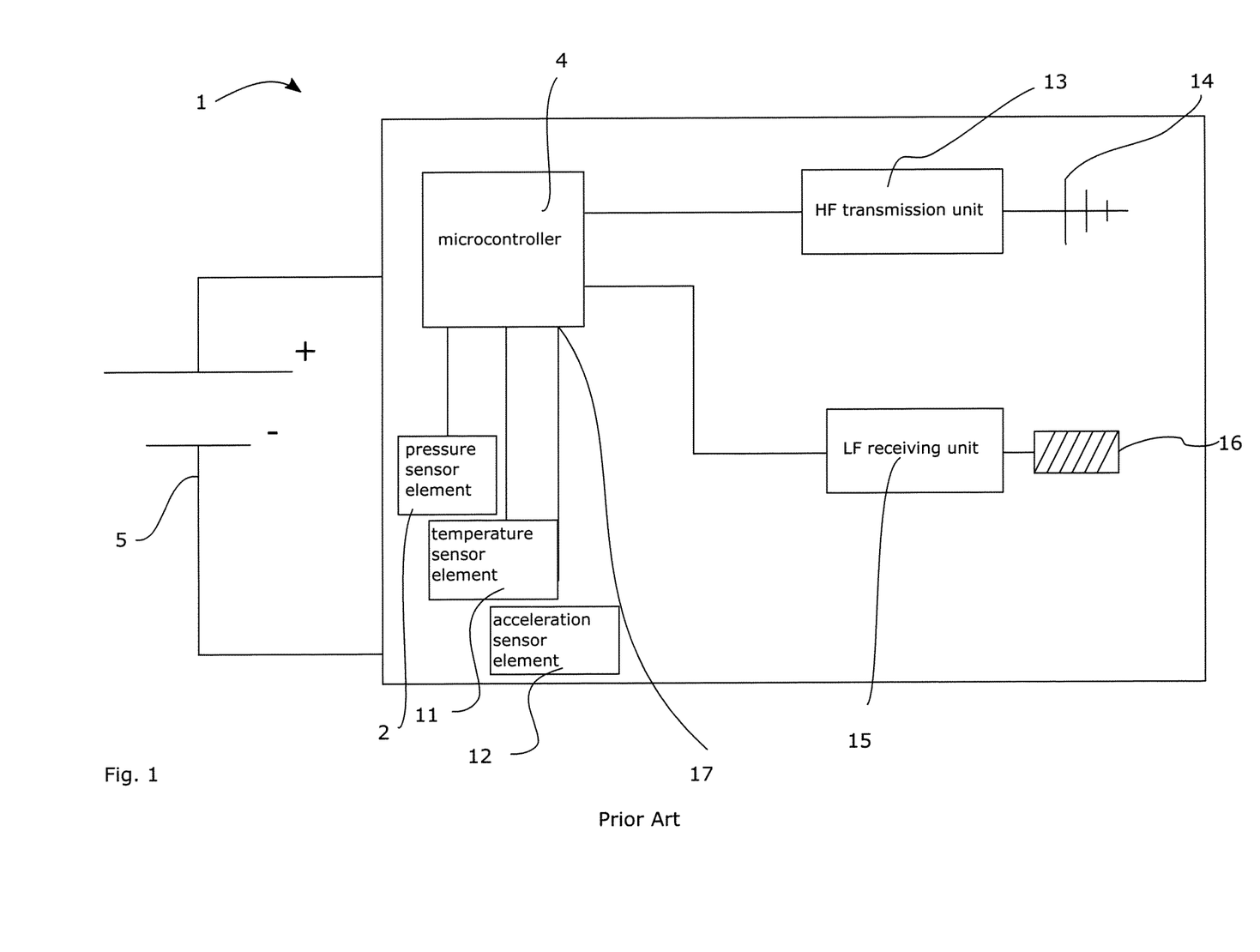
FIG. 1: an exemplary embodiment of a tire pressure sensor according to the invention.

FIG. 1 shows a schematic depiction of a tire pressure sensor 1 known from practice. In the depicted embodiment, the tire pressure sensor 1 is provided as an integrated sensor IC. This exemplary tire pressure sensor 1 has a pressure sensor element 2 which is coupled to a microcontroller 4. In addition to the pressure sensor element 2, a temperature sensor element 11 and an acceleration sensor element 12 are coupled to the microcontroller 4. Among other things, the microcontroller 4 performs the task of collecting and evaluating sensor responses which the sensor elements for pressure 2, temperature 11, and acceleration 12 detect in response to the corresponding physical stimuli. After the evaluation of the detected data by the microcontroller 4, the data are used for further communication with a control device (not depicted) of the motor vehicle. Furthermore, a memory element can optionally be provided, in which the detected parameters are temporarily stored for a later read-out. It is also possible to store a history of parameters as well as, alternatively or additionally, one or more points in time of past read-out processes. The communication with the control device of the motor vehicle takes place within the framework of a bidirectional radio link. The bidirectional radio link comprises a transmitting of evaluated measurement data, wherein the transmitting is carried out via an HF antenna 14, which is controlled by an HF transmission unit 13 coupled to the HF antenna 14. The individual components of the tire pressure sensor 1 are supplied with voltage by means of the battery 5. For receiving request instructions or other control commands, the LF antenna 16 is provided, which is coupled to an LF receiving unit 15. Via the LF antenna 16 and the LF receiving unit 15, the tire pressure sensor 1 is able to receive control instructions from the control device. The microcontroller 4 is designed to evaluate and implement the control instructions.

In embodiments of a tire pressure sensor 1 known from practice, the microcontroller 4 is designed to assume an idle state. For example, it can be provided that the idle state is assumed by the microcontroller 4 when no movement of the tire pressure sensor 1 has been detected for a predetermined period of time. A movement performed during the idle state of the microcontroller 4 is detected by the acceleration sensor element 12 and results in a wake-up signal which is applied to the input pin 17. When it receives said wake-up signal, the microcontroller is subsequently returned from its idle state to the active operating mode.

Figure 2:
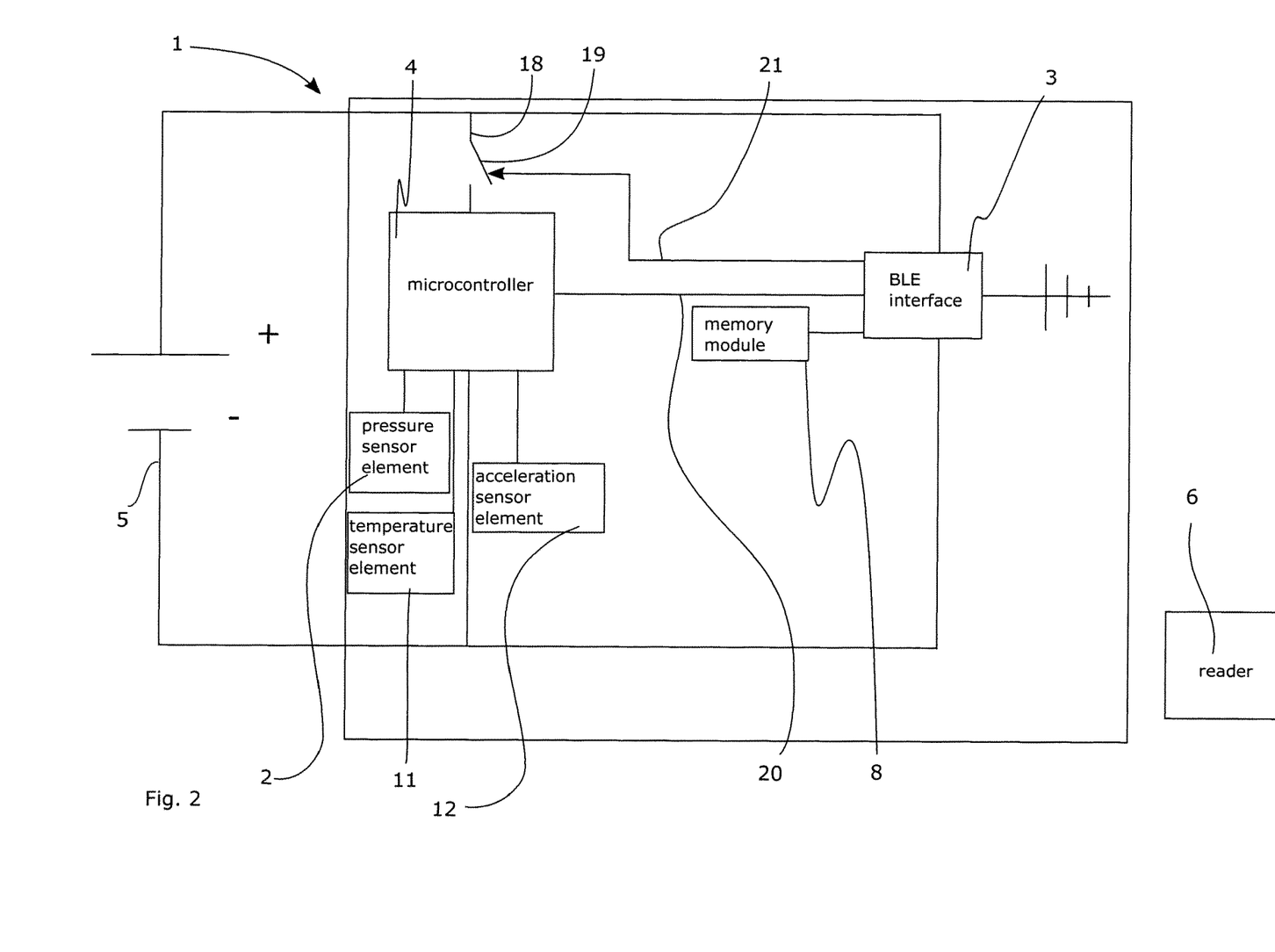
FIG. 2: a tire pressure sensor known from practice.

FIG. 2 shows an exemplary embodiment of a tire pressure sensor 1 according to the invention. The tire pressure sensor 1 according to the invention has a pressure sensor element 2. The pressure sensor element 2 is coupled to a microcontroller 4. Among other things, the microcontroller 4 is used to control the pressure sensor element 2 and to acquire data which the pressure sensor element 2 detects. The microcontroller 4 is coupled to a radio communication interface designed as a Bluetooth low-energy interface 3, wherein, in the depicted embodiment, the coupling with the Bluetooth low-energy interface 3 and the coupling to the pressure sensor element 2 is present as a parallel connection. A series connection of the BLE interface 3 and the pressure sensor element 2 can also be provided with the advantage that a direct control access of the BLE interface 3 to the pressure sensor element 2 can be provided. The BLE interface 3 is connected to the microcontroller via the connection 20, wherein other suitable connections of the BLE interface with the microcontroller can naturally also be provided. The microcontroller 4 is designed to be switchable between an energy-saving mode and an active operating mode. In the depicted embodiment, the switch-over of the microcontroller is effected in that the electrical connection 18 between the microcontroller 4 and the battery 5 is disconnected for a switch-over to the energy-saving mode and reconnected for a switch-over to the active mode. In order to accomplish the switch-over, the input of the connection 20 in the BLE interface 3 has a sufficiently high input resistance. In FIG. 2, the connection 18 is disconnected, and so the microcontroller is in the energy-saving mode. The BLE interface 3 is designed to establish a BLE communication with a reader 6, provided that the reader 6 is also designed for a BLE communication. The BLE interface 3 is designed to execute instructions, according to which, after detecting a BLE communication with the reader 6, this BLE communication is interpreted as a trigger to switch the microcontroller 4 from its energy-saving mode to its active operating mode. In the depicted embodiment, this switching operation takes place in that the BLE interface outputs a switching signal (indicated by arrow 21), which controls an actuator, with which the switch 19 is actuated and the connection 18 is closed. By closing the circuit between the battery 5 and the microcontroller 4 in that the connection 18 to the switch 19 is closed, the microcontroller 4 immediately starts its operation, i.e., it once again operates in its active operating mode. In this operating mode, the microcontroller 4 is able to read and interpret measurement data acquired by the pressure sensor element 2. In cases, in which the pressure sensor element 2 is a controllable pressure sensor element 2, the microcontroller 4 is additionally responsible for controlling the pressure sensor element 2. FIG. 2 also shows a temperature sensor element 11 and an acceleration sensor element 12, wherein these components are optional and not essential to the invention.

The tire pressure sensor 1 also has a memory module 8, which is coupled to the BLE interface 3. Identification data, with which predetermined identifiable readers are characterized, are stored in the memory module 8. The BLE interface 3 is designed to supplement a contact attempt of a reader 6 with a comparison between identification data of the reader 6 and the stored identification data, wherein a switch-over of the microcontroller to its active operating mode is initiated only when the identification data stored on the memory module 8 verify the authorization of the reader 6. The memory module is part of an advantageous development of the invention; however, the invention is also executable without said memory module 8.

Figure 3:
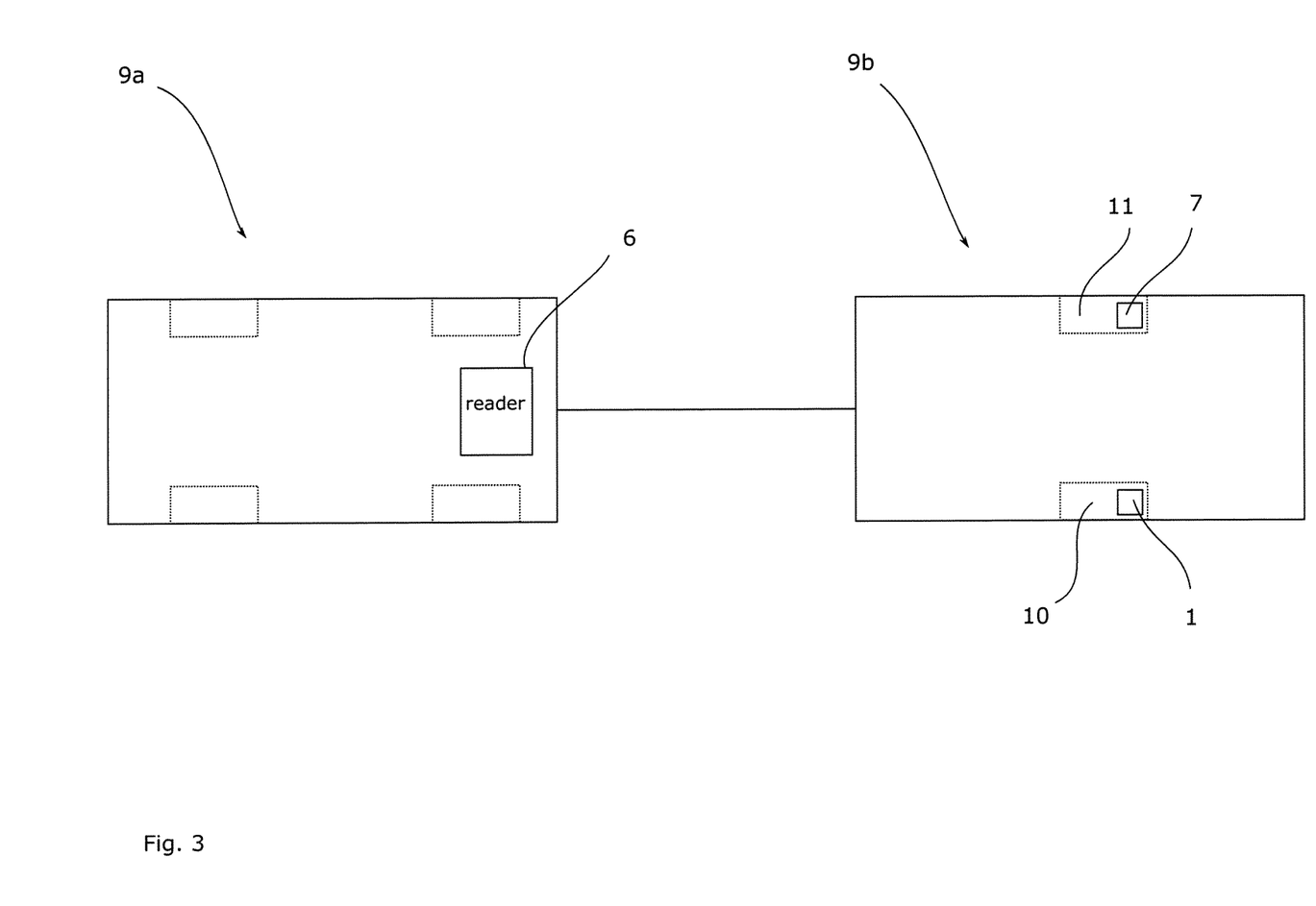
FIG. 3: a schematic outline of a motor vehicle with an attached trailer.

FIG. 3 shows a trailer 9b which is connected to a towing vehicle 9a. The towing vehicle 9a has a reader 6 which is designed to respond to a tire pressure sensor 1, wherein the resulting communication between the reader 6 and the tire pressure sensor 1 takes place by means of a BLE communication. For this purpose, the tire pressure sensor is designed according to an embodiment that corresponds to the embodiment shown in FIG. 2. The trailer 9b has a first tire 10 and a second tire 11. The first tire 10 comprises a tire pressure sensor 1, and the second tire 11 comprises a further tire pressure sensor 7 which has a further BLE interface.

The invention claimed is:

1. Tire pressure sensor, wherein the tire pressure sensor comprises:
   a pressure sensor element;
   a radio communication interface which is designed as a Bluetooth low-energy interface (BLE interface);
   a microcontroller that is coupled to the pressure sensor element and the radio communication interface and that can be switched between a mode with reduced energy consumption and an active operating mode; and
   a battery or an energy generator for voltage supply,
   wherein the radio communication interface is designed to establish a radio communication with a reader designed for radio communication and to initiate a switch-over of the microcontroller from its mode with reduced energy consumption to its active operating mode on the basis of the radio communication being established,
   wherein the BLE interface is designed to establish a BLE communication with the reader designed for BLE communication and to initiate a switch-over of the microcontroller from its mode with reduced energy consumption to its active operating mode on the basis of the BLE communication being established,
   wherein the BLE interface comprises a memory module or is coupled to a memory module, in which identification data of at least one predetermined identifiable reader are stored, and
   wherein the BLE interface is designed to initiate the switch-over of the microcontroller to its active operating mode only after the prerequisite of the BLE communication taking place with the at least one predetermined reader is met,
   wherein an identification code of the reader is queried, and the microcontroller is switched over to the active operating mode only in the event that the identification code corresponds to an expected identification code.

2. The tire pressure sensor according to claim 1, wherein the radio communication interface is a Bluetooth interface or an NFC interface.

3. The tire pressure sensor according to claim 1,
wherein the BLE interface is designed to assume an advertising state for indicating its readiness to establish a connection when the microcontroller is in the mode with reduced energy consumption, and
wherein the BLE interface is designed to initiate the switch-over of the microcontroller to its active operating mode at a time which immediately, or after a predetermined interval, follows a detection of a connect request of the reader by the BLE interface.

4. The tire pressure sensor according to claim 1,
wherein the BLE interface is designed to assume an advertising state for indicating its readiness to establish a connection when the microcontroller is in the mode with reduced energy consumption, and
wherein the BLE interface is designed to initiate the switch-over of the microcontroller to its active operating mode at a time which immediately, or after a predetermined interval, follows an establishing of a BLE connection of the BLE interface with the reader.

5. The tire pressure sensor according to claim 1,
wherein the BLE interlace is designed to form a network or part of a network with the reader within the framework of the BLE communication, in which the BLE interface assumes peripheral status and the reader assumes central status.

6. Tire The tire pressure sensor according to claim 1,
wherein the BLE interface is designed to form a network or part of a network with the reader within the framework of the BLE communication, in which the BLE interface assumes central status and the reader assumes peripheral status.

7. Tire The tire pressure sensor according to claim 6, wherein the BLE interface is designed such that, after establishing a connection with the reader in a connected mode, the transmission and reception power and/or the transmission times can be set, by means of controlling by the reader.

8. Tire The tire pressure sensor according to claim 5,
wherein the BLE interface is designed, in a central status, to assume a scanning state in order to detect further BLE interfaces and to form a tire pressure sensor network with said further BLE interfaces.

9. The tire pressure sensor according to claim 8, wherein the BLE interface is designed to receive and temporarily store data packets, particularly measurement data, transmitted by other BLE interfaces, and, after establishing a connection with the reader, to transmit the data packets to the reader in a connected mode.

10. The tire pressure sensor according to claim 1, wherein the microcontroller and the battery are connected by means of a separable galvanic coupling, wherein the galvanic coupling between the battery and the microcontroller is undone when the microcontroller is in the mode with reduced energy consumption, such that the microcontroller is inactive, and
wherein the radio communication interface, which is designed as a BLE interface, is designed to establish the electrical connection for effecting a voltage supply to the microcontroller, which causes the microcontroller to switch over to the active operating mode.

11. The tire pressure sensor according to claim 1, wherein, the microcontroller is a first microcontroller and, the tire pressure sensor further comprises a second microcontroller, wherein the first microcontroller is designed to control a first functionality, and the second microcontroller is designed to control a second functionality, and wherein the first microcontroller and the second microcontroller are switchable independently from one another between a mode with a reduced energy consumption and an active operating mode, wherein the first microcontroller is designed to put the second microcontroller into an active operating mode when the first microcontroller has assumed a predetermined mode, when the BLE communication has assumed a predetermined mode.

12. A tire pressure sensor, wherein the tire pressure sensor comprises:
a pressure sensor element;
a position and/or acceleration sensor;
a radio communication interface which is designed as a Bluetooth low-energy interface (BLE interface);
a microcontroller that is coupled to the pressure sensor element and the radio communication interface and that can be switched between a mode with reduced energy consumption and an active operating mode; and
a battery for voltage supply,
wherein the radio communication interface is designed to establish a radio communication with a reader designed for radio communication and to initiate a switch-over of the microcontroller from its mode with reduced energy consumption to its active operating mode on the basis of the BLE communication being established in addition to a change in the position and/or acceleration of the position and/or acceleration sensor,
wherein an identification code of the reader is queried, and the microcontroller is switched over to the active operating mode only in the event that the identification code corresponds to an expected identification code.

13. Method for reading data from a tire pressure sensor, comprising:
providing a tire pressure sensor including a pressure sensor element;
a position and/or acceleration sensor;
a radio communication interface which is designed as a Bluetooth low-energy interface (BLE interface);
a microcontroller that is coupled to the pressure sensor element and the radio communication interface and that can be switched between a mode with reduced energy consumption and an active operating mode; and
a battery for voltage supply,
wherein the radio communication interface is designed to establish a radio communication with a reader designed for radio communication and to initiate a switch-over of the microcontroller from its mode with reduced energy consumption to its active operating mode on the basis of a change in the position and/or acceleration of the position and/or acceleration sensor, wherein
the radio communication interface designed as a BLE interface repeatedly transmits measured values or tire parameters derived from measured values with an advertise package in an advertising state of the tire pressure sensor, wherein a period between a first transmission and a repeated and updated transmission is selected on the basis of a driving status, particularly a detected minimum acceleration, of the tire, in which the tire pressure sensor is arranged, and wherein
the transmitted data are received by a reader designed for BLE communication, wherein an identification code of the reader is queried, and the microcontroller is switched over to the active operating mode only in the event that the identification code corresponds to an expected identification code.

14. The method according to claim 13, wherein
in a first phase, the data are transmitted using each of three advertising channels provided,
in a second phase, the reader sequentially queries a first of the three advertising channels, followed by a second of the three advertising channels, and subsequently a third of the three advertising channels, wherein each query is followed by a pause.

15. The method according to claim 14, wherein, after a specific duration of the second phase, the second phase is interrupted by a third phase, in which a transmission takes place using each of the three advertising channels provided.

16. Use of a tire pressure sensor for transmitting a tire pressure of a stationary trailer to a portable reader or to a reader carried along in a towing vehicle,
wherein the tire pressure sensor comprises:
a pressure sensor element;
a radio communication interface which is designed as a Bluetooth low-energy interface (BLE interface);
a microcontroller that is coupled to the pressure sensor element and the radio communication interface and that can be switched between a mode with reduced energy consumption and an active operating mode; and
a battery or an energy generator for voltage supply,
wherein the radio communication interface is designed to establish a radio communication with a reader designed for radio communication and to initiate a switch-over of the microcontroller from its mode with reduced energy consumption to its active operating mode on the basis of the radio communication being established,
wherein the BLE interface is designed to establish a BLE communication with the reader designed for BLE communication and to initiate a switch-over of the microcontroller from its mode with reduced energy consumption to its active operating mode on the basis of the BLE communication being established,
wherein the BLE interface comprises a memory module or is coupled to a memory module, in which identification data of at least one predetermined identifiable reader are stored, and
wherein the BLE interface is designed to initiate the switch-over of the microcontroller to its active operating mode only after the prerequisite of the BLE communication taking place with the predetermined reader is met,
wherein an identification code of the reader is queried, and the microcontroller is switched over to the active operating mode only in the event that the identification code corresponds to an expected identification code.

* * * * *